United States Patent
Varone

(10) Patent No.: US 12,390,776 B2
(45) Date of Patent: Aug. 19, 2025

(54) DEVICE FOR TREATING LIQUIDS BY ELECTROMAGNETISM AND STIRRING

(71) Applicant: SEDUNA SCT SA, Carouge (CH)

(72) Inventor: Jean-Daniel Varone, Sion (CH)

(73) Assignee: SEDUNA SCT SA, Carouge (CH)

(*) Notice: Subject to any disclaimer, the term of this patent is extended or adjusted under 35 U.S.C. 154(b) by 788 days.

(21) Appl. No.: 17/442,577

(22) PCT Filed: Mar. 25, 2020

(86) PCT No.: PCT/IB2020/052808
§ 371 (c)(1),
(2) Date: Sep. 23, 2021

(87) PCT Pub. No.: WO2020/194206
PCT Pub. Date: Oct. 1, 2020

(65) Prior Publication Data
US 2022/0184569 A1    Jun. 16, 2022

(30) Foreign Application Priority Data

Mar. 26, 2019 (CH) .................................. CH0393/19

(51) Int. Cl.
| | | |
|---|---|---|
| *B01F 33/451* | (2022.01) | |
| *A23B 2/00* | (2025.01) | |
| *A23B 2/53* | (2025.01) | |
| *A23B 2/60* | (2025.01) | |
| *A23B 70/50* | (2025.01) | |
| *A23L 2/50* | (2006.01) | |
| *A23L 3/00* | (2006.01) | |
| *A23L 3/28* | (2006.01) | |

(Continued)

(52) U.S. Cl.
CPC ............ *B01F 33/451* (2022.01); *A23B 2/001* (2025.01); *A23B 2/53* (2025.01); *A23B 2/60* (2025.01); *A23B 70/50* (2025.01); *C02F 1/32* (2013.01); *C02F 1/482* (2013.01); *C12G 1/00* (2013.01); *C12G 3/08* (2013.01); *C12H 1/165* (2013.01)

(58) Field of Classification Search
CPC .. C02F 1/32; C02F 1/482; C02F 1/481; C02F 1/48; C12G 1/00; C12G 3/08; C12H 1/165; C12H 1/16; B01F 33/451; A23L 2/50; A23L 3/001; A23L 3/28; A23L 3/32; A23L 3/00; A23L 3/3589
USPC ......................................................... 210/695
See application file for complete search history.

(56) References Cited

U.S. PATENT DOCUMENTS

| | | | | |
|---|---|---|---|---|
| 5,997,812 A | * | 12/1999 | Burnham | .................. C02F 1/48 |
| | | | | 210/695 |
| 2003/0003189 A1 | * | 1/2003 | Lutzker | .................. C12H 1/165 |
| | | | | 426/11 |
| 2004/0124136 A1 | * | 7/2004 | Bak | ........................ B01J 19/006 |
| | | | | 210/512.1 |

FOREIGN PATENT DOCUMENTS

| | | |
|---|---|---|
| CN | 206887079 U | 1/2018 |
| EP | 2711075 A2 | 3/2014 |
| WO | WO-2014/079809 A1 | 5/2014 |

OTHER PUBLICATIONS

International Search Report for PCT/IB2020/052808, dated Sep. 22, 2021, 3 pgs.

* cited by examiner

*Primary Examiner* — Akash K Varma
(74) *Attorney, Agent, or Firm* — Blank Rome LLP

(57) ABSTRACT

The invention relates to a fluid treatment device comprising a stirring element and at least one magnetic device. The (Continued)

stirring element has a plurality of flutes within its central portion, and the magnetic devices are placed around the stirring element. The device can further comprise a UV irradiation module and an on-line analysis module.

11 Claims, 10 Drawing Sheets

(51) Int. Cl.
  *A23L 3/32* (2006.01)
  *C02F 1/32* (2023.01)
  *C02F 1/48* (2023.01)
  *C12G 1/00* (2019.01)
  *C12G 3/08* (2006.01)
  *C12H 1/16* (2006.01)

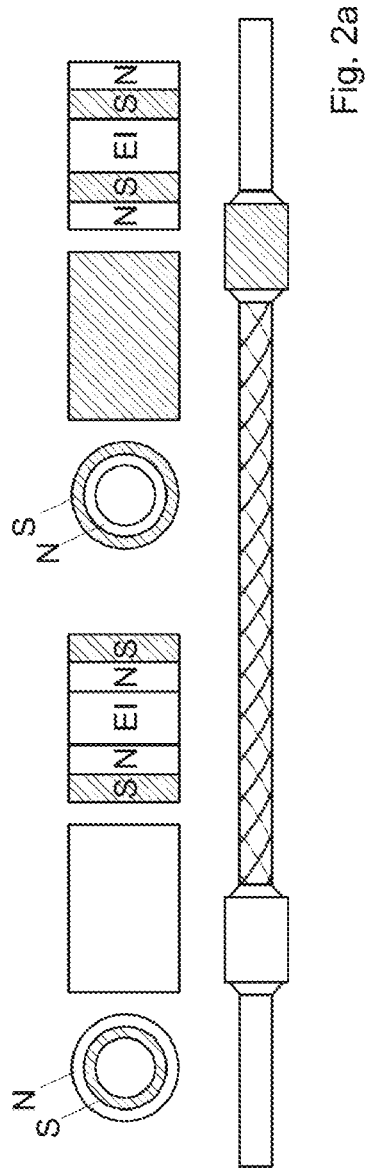
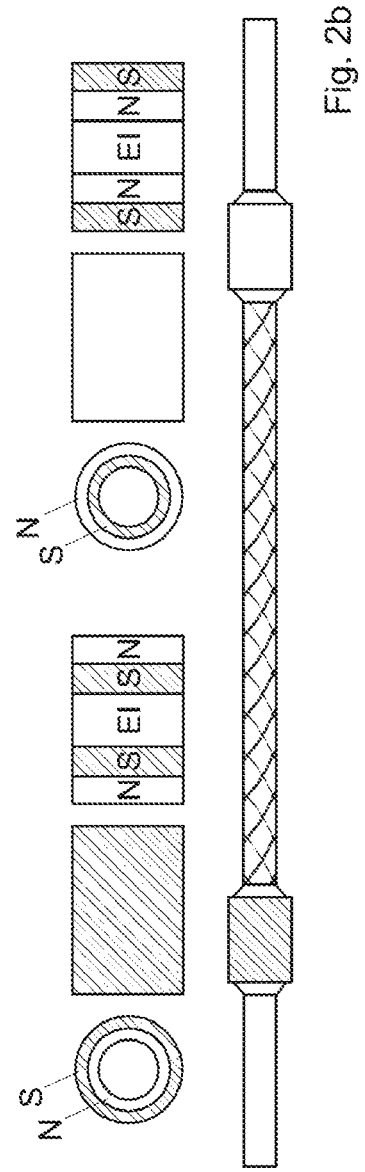

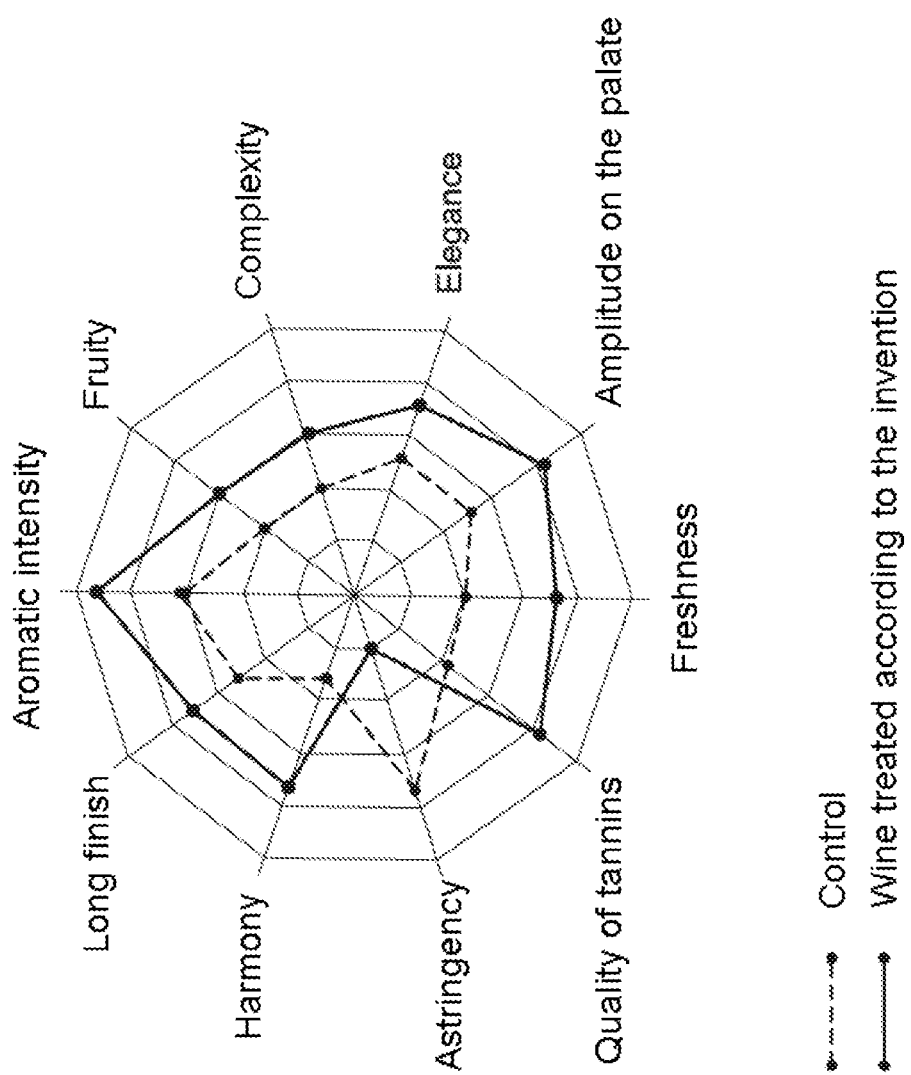

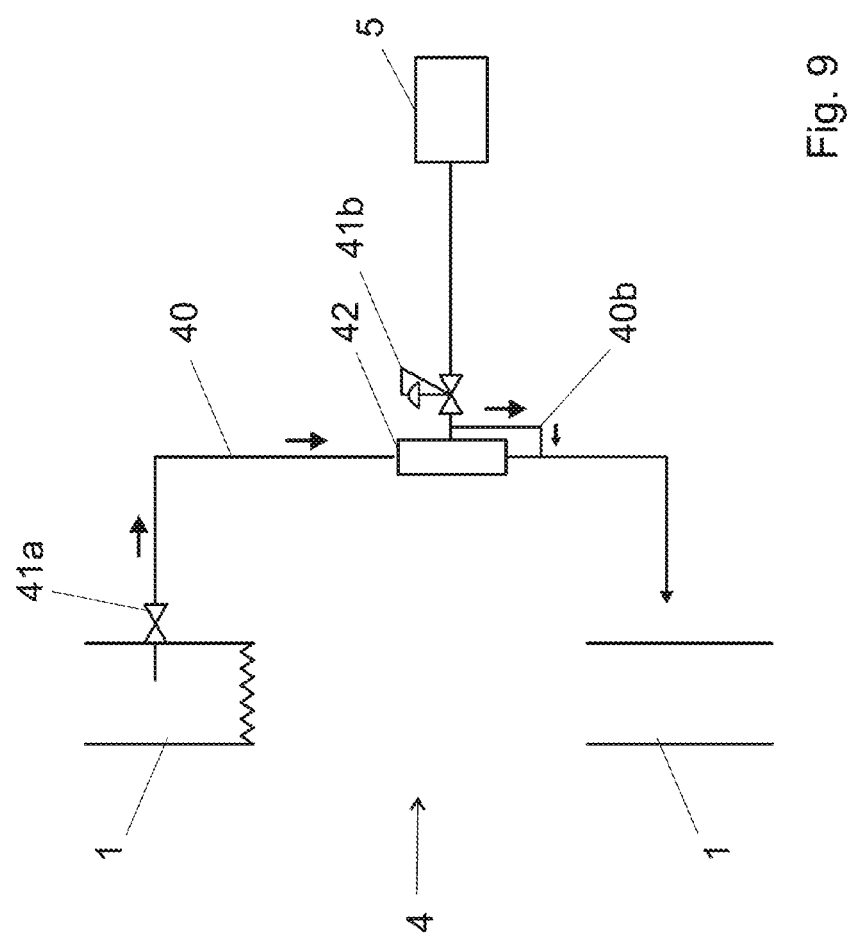

DEVICE FOR TREATING LIQUIDS BY ELECTROMAGNETISM AND STIRRING

RELATED APPLICATIONS

The present application is a national phase of PCT/IB2020/052808, filed Mar. 25, 2020, which claims the benefit of Swiss Patent Application No. CH0393/19, filed Mar. 26, 2019. The entire disclosures of which are hereby incorporated by reference.

TECHNICAL FIELD

The present invention relates to a device for treating fluids, in particular for treating alimentary fluids such as wines or distilled alcohols. The device has a stirring element and at least one magnetic element, disposed so as to combine their effects on the fluids to be treated.

PRIOR ART

Fluid treatment devices involving vortices are already known. The document US2004124136 presents, for example, such a device for purifying water. However, such devices can be difficult to apply to complex alimentary fluids such as wine or distilled alcohols. This is because the effects of stirring may be detrimental to the organoleptic characteristics of such beverages.

Magnetic field generators may also be used to treat fluids. The magnetic fields are, for example, used in conjunction with electrically conductive fluids in devices such as magnetohydrodynamic (MHD) converters, and make it possible to set the fluids in motion. Effects of passivation of water under the influence of such magnetohydrodynamic converters have been described. The application of magnetic fields to wine is also described in the document US20030003189 as being beneficial to alleviating certain taste-related parameters such as acidity or astringency.

However, there is a need to improve such methods, in particular in order to manage the organoleptic potential and the change in the properties of the beverage over time, from the point of view both of taste and of texture. The objective of the present invention is in particular to develop, stabilize or optimize the organoleptic potential of complex fluids such as wine or distilled alcohols.

BRIEF SUMMARY OF THE INVENTION

An aim of the present invention is to propose a device for treating alimentary fluids, such as wine or other fermented alcohols, or distilled alcohols, in order to preserve, improve or stabilize the organoleptic properties thereof and the change thereof over time. In this case, the present invention makes it possible to limit or eliminate some or all of the additives associated with the preservation of beverages. The additives associated with the preservation of beverages include sulfites, without being limited thereto. The preservation of the beverage includes tartaric stabilization if necessary. The preservation, improvement or stabilization of such beverages also includes increasing or reducing the concentration of dissolved gases, in particular oxygen.

More generally, the objective of the present invention is to manage the organoleptic potential of beverages such as wine or other fermented alcohols such as beer, or distilled alcohols. The management of such properties includes adapting them to a given set of consumers, to correct any defects they may have, to reduce or accentuate certain characteristics, to create original or little known organoleptic characteristics, without being limited to just these aspects. The management of the organoleptic properties of such a beverage includes the aromatic refinement thereof. The management of the organoleptic properties also includes the elimination of or reduction in astringency, acidity, or other taste-related aspects. The management of the organoleptic properties also includes the preservation and stabilization thereof. In this case, the aging or maturation processes can be shortened, lengthened, or modified so as to correspond to given organoleptic properties.

The term "organoleptic" denotes here all of the aspects relating to the sensation experienced by the consumer, be this taste, smell, mechanical and texture perception, visual perception, or other types of perception.

One particular objective of the present invention is to stabilize the physicochemical parameters, such as the pH, the surface tension, the rheological parameters, the redox potentials, the resistivity, the saturation temperature or the turbidity, or to modify these, or to modify the change thereof over time.

Another objective of the present invention is to simplify the methods for producing such beverages, in particular by making it possible to do away with one or more method steps. In a wine-producing method, the steps of clarifying or filtration or both steps can be simplified or eliminated. According to one aspect, the treatment of fluids by means of the present invention can take place at the end of the production process, at the time of placement into storage for marketing. The placement into storage includes bottling. Alternatively, a treatment step according to the present invention can take place between two steps that are already known. For example, before fermentation, or during fermentation if the liquids in question are fermented liquids. The treatment according to the present invention can be effected before distillation if the fluid is a distilled fluid.

According to one particular embodiment, the treatment method according to the present invention is continuous and may be implemented in a pre-existing pipe allowing the fluid to be treated to pass from one location to another, for example from a settling tank to a fermenting tank or from a maturation tank to a storage reservoir. Advantageously, the treatment method has no impact on the duration of the fluid production method, in particular it does not lengthen it, on account of its being integrated into the pre-existing devices and of its continuous operation. More advantageously, the treatment method according to the present invention makes it possible to reduce the production time of the fluid before it is marketed.

To this end, a fluid treatment device is presented. The device comprises in particular a stirring element and at least one magnetic device. The stirring element is advantageously in the form of a tube having a plurality of flutes, or chicanes. The flutes are preferably disposed within its central portion. The magnetic device(s), for their part, are disposed around the stirring element, preferably at locations that do not have flutes. In particular, the ends of the stirring element may be devoid of flutes.

According to one particular provision, the magnetic device(s) are polarized such that the South-North field lines are orthogonal to the direction of flow of the fluids to be treated. To this end, the magnetic device may be circular, disposed around the stirring element and designed such that its South-North polarity is radial, that is to say oriented from the center of the circular magnetic device to its periphery or, by contrast, from its periphery to its center. Alternatively, the magnetic device(s) are polarized such that the South-North magnetic field lines are parallel to the direction of flow of the fluids to be treated.

According to one preferred provision, the flutes of the stirring element are paired up such that the orientations of the flutes of one and the same pair are opposite to one another. Several sets of flutes are disposed along the stirring element. The sets of flutes are preferably offset from one another so as to divide the flow of fluid to be treated.

According to one particular arrangement, the maximum width of the flutes is equal to or less than half the diameter of the stirring element. The flutes may for example have a helical shape, although other shapes may be envisioned.

The permanent magnets surrounding the stirring tube can be protected by magnetic shielding, by a protective layer of polymer, or by a superposition of magnetic shielding and a protective layer of polymer. The device may also have a chamber, the length of which is less than or equal to, or greater than that of the stirring element.

The fluid treatment device may also comprise one or more devices for light irradiation, in particular in the ultraviolet region. Such light irradiation devices are advantageously disposed around the stirring tube, in particular at the locations where the stirring tube has flutes. The light irradiation device may be part of an irradiation module that can be integrated in or added to the treatment device.

The present invention also covers a method for treating a fluid. The fluid is fed into the stirring element, where it passes through a first magnetic field, and then a succession of flutes, or sets of flutes which induce disruptions in the flow of the fluid. The fluid then passes through a second magnetic field before it can be collected. The disruptions caused by the flutes in the flow of the fluid are of the vortex type.

Preferably, the first and second magnetic fields have opposite polarities to one another.

BRIEF DESCRIPTION OF THE FIGURES

Implementation examples of the invention are indicated in the description illustrated by the appended figures, in which:

FIGS. 2a, 2b, 2c, 2d: show schematic views of several configurations of the magnetic devices according to the present invention.

FIG. 4: shows an example of a taste profile of a wine treated according to the invention and an untreated wine.

FIG. 9: shows a schematic view relating to the positioning of an on-line analysis module.

EXEMPLARY EMBODIMENT(S) OF THE INVENTION

Figure 1:
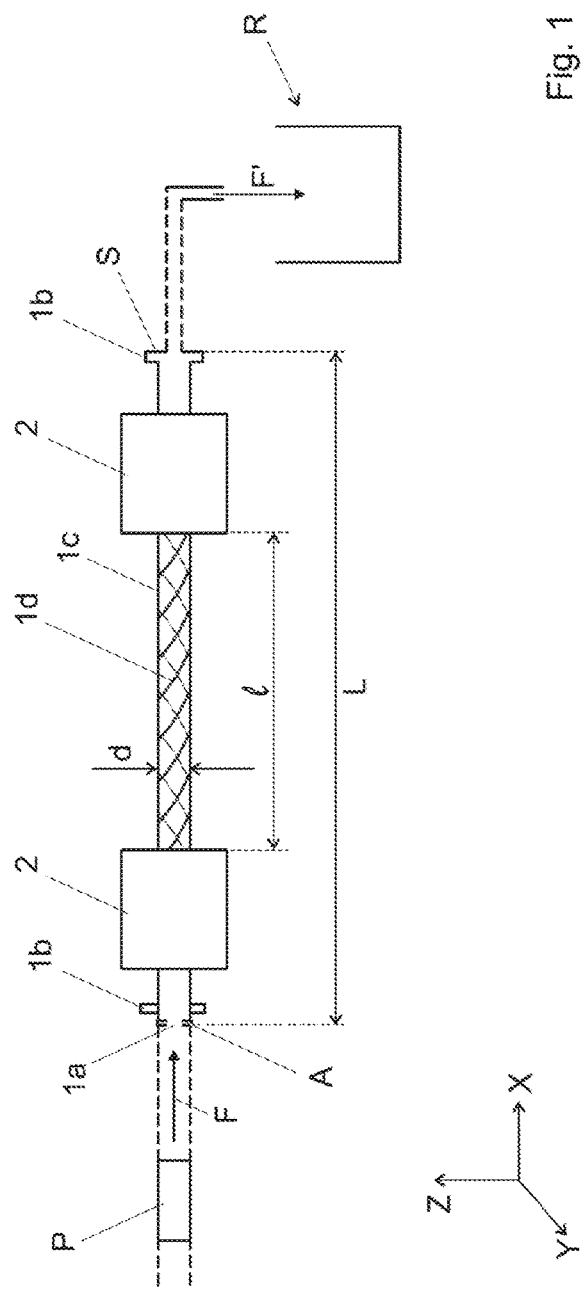
FIG. 1: shows a schematic view of the treatment device according to the invention.
Figure 2C:
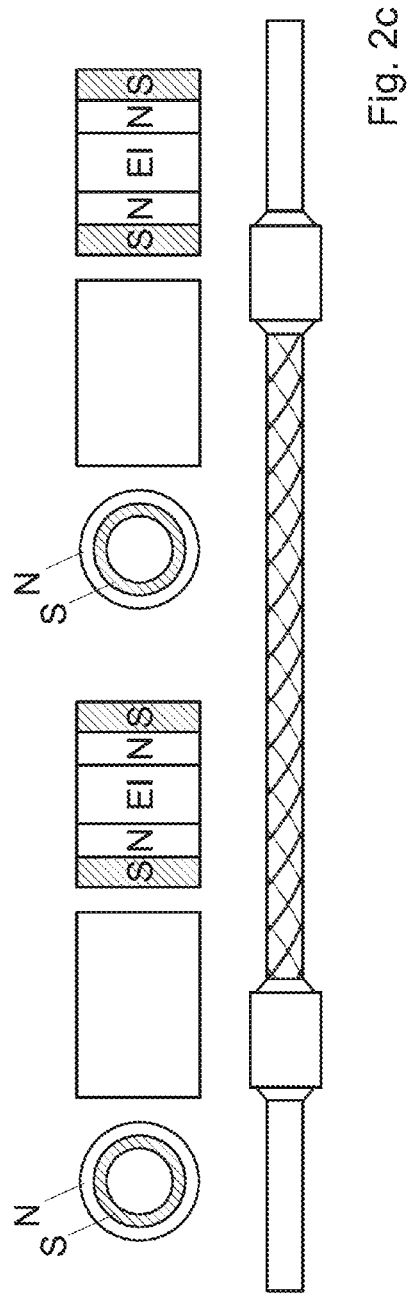
Figure 2D:
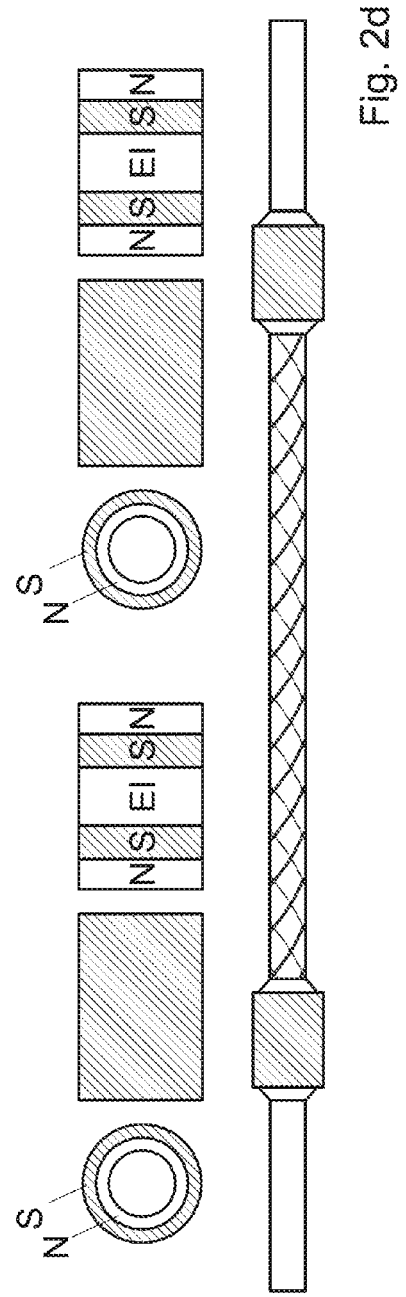

The device D of the present invention has a stirring element 1 for dividing and homogenizing the fluids. The stirring element 1 is designed for stirring a fluid F according to a continuous method, meaning that it can be fed permanently and without interruption. Such a method is often simpler and more economical than batch methods. The stirring element 1 according to the present invention therefore has a feed A, via which the fluid F to be treated is introduced into the stirring element 1, and an outlet 8, via which the treated fluid F' is collected. The flow of fluid F to be treated is continuous and the flow rate can be regulated upstream, in particular by means of a pump P.

The stirring element 1 preferably comprises a cylindrical tube 1c, one end of which constitutes, or is provided with, a feed system A for the fluid F to be treated and the other end of which constitutes, or is provided with, a system for collecting the treated liquid F'. The feed A can alternatively or additionally comprise a diaphragm 1a for regulating the flow rate of fluid F to be treated at the inlet of the stirring element 1. The collection of the treated fluid F' at the end S of the stirring element 1 can be effected directly or by way of a reservoir R. One or the other, or both, of the feed A and outlet S may have a connecting flange 1b. If necessary, the diaphragm 1a may be included in the connecting flange 1b. The connecting flange(s) 1b make it possible to connect the stirring element 1 to any type of duct such as a hose or metal pipe.

The speed of the fluid F to be treated within the stirring element 1 is preferably between 0.5 and 3 m/s. The speed of the fluid F to be treated may advantageously be between 1 and 1.5 m/s.

The flow rate of the fluid F to be treated is regulated by the diaphragm 1a. Alternatively, the flow rate can be regulated directly by the feed pump P. The flow rate of the fluid F to be treated can be adapted to the dimensions of the stirring element 1, in particular to its diameter d, its length L, and other parameters that characterize it.

The internal wall of the stirring element 1 is provided with flutes 1d oriented in a non-linear manner with the longitudinal axis of the stirring element 1. The flutes 1d are preferably oriented at an angle of between 30 and 50 degrees with respect to the longitudinal axis of the stirring element 1. The longitudinal axis of the stirring element 1 is oriented in the direction x in FIG. 1, and corresponds to the general direction of flow of the fluid F to be treated from the feed A to the outlet 8 of the stirring element 1. The flutes 1d are preferably oriented at an angle of around 45 degrees with respect to the longitudinal axis of the stirring element 1. A flute 1d may for example take the form of a spacer fixed to the inner wall of the stirring element 1, of straight or curved shape, and of variable width. The width of a flute 1d may for example correspond to half, or be less than half, of the diameter d of the stirring element 1. The length of a flute 1d is variable but significantly less than the length of the stirring element 1, so that it is possible to dispose several flutes 1d one after another along the stirring element 1. The flutes 1d are disposed along the stirring element 1 in a disruptive manner. They are in particular offset from one another so as to divide the flow of fluid F to be treated as it passes from one flute 1d to the next. The flutes 1d may for example be disposed in a staggered manner or be offset by an angle of 20, 30, 40 or 50 degrees with respect to one another.

Preferably, the flutes 1d are disposed in pairs on the internal wall of the stirring element 1, so as to face one another. The flutes 1d of one pair may then be positioned in a symmetric or inverted manner, or simply be offset by a certain angle with respect to one another.

According to one particular arrangement, the pairs of flutes 1d are disposed in an inverted manner, meaning that the orientation of the facing flutes 1d is inverted. The width of the flutes 1d may correspond to half the diameter d of the stirring element 1 such that they meet at the center of the stirring element 1. If they have a width less than half the diameter d, a part of the fluid F to be treated can pass through the center of the stirring element 1 without coming into contact with the flutes 1d.

Preferably, the stirring element has several pairs of flutes 1d disposed facing one another. For example, the stirring element 1 may have 3, 5, 7, 10, 15, or more than twenty pairs of flutes 1d depending on the requirements of the treatment.

According to one variant of the present invention, it is possible for the flutes 1d not to all have the same width along the stirring element 1.

According to another variant, the flutes 1d are all identical.

According to another variant, the flutes 1d may have a non-constant width, meaning for example that they can taper at one or both of their ends and bulge in their central portion. Alternatively, they may have a triangular shape, i.e. have one end wider than the other. Other shapes may be considered.

According to another variant of the present invention, the flutes 1d may be sorted into 3s or 4s and not just into pairs.

Figure 5A:
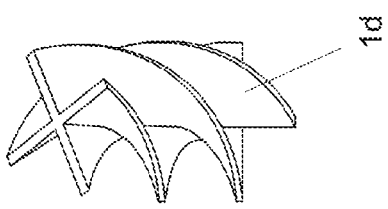
FIGS. 5a, 5b, 5c: show examples of geometries of flutes.
Figure 5B:
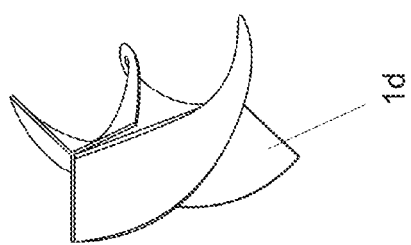
Figure 5C:
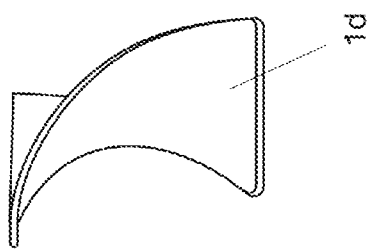

According to another variant of the present invention, the flutes 1d are helical. FIGS. 5a, 5b and 5c show examples of such flutes 1d, which may for example comprise two helical channels (FIG. 5a), or three helical channels (FIG. 5b), or four helical channels (FIG. 5c).

Figure 6:
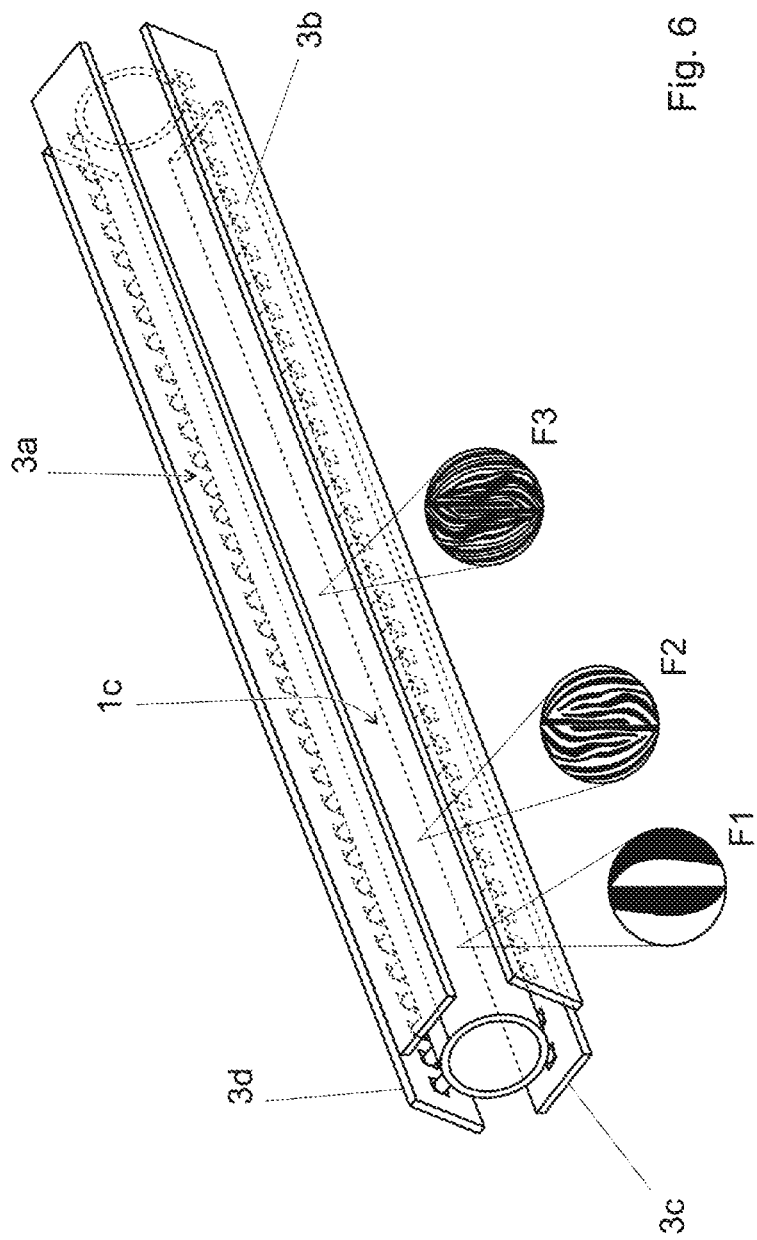
FIG. 6: shows a schematic view of a stirring element provided with flutes and a UV irradiation device.

The geometry, the number, the disposition and the dimensions of the flutes 1d may be determined so as to divide the flow F of liquid to be treated into increasingly thin and separated films of flow. The geometry, the number, the disposition and the dimensions of the flutes 1d may also or alternatively be determined so as to promote the vortices in the flow F of the liquid to be treated. The shares of laminar flow and of turbulences in the flow F of the liquid may be optimized by virtue of the parameters of the flutes 1d. FIG. 6 schematically depicts the divisions F1, F2, F3 of the flows of liquid passing through the successive flutes 1d.

According to one variant, the sets of flutes are contiguous with one another along the length of the stirring element 1.

According to another provision, the sets of flutes 1d are spaced apart from one another along the stirring element 1.

According to one particular provision, the sets of flutes 1d are grouped in several separate groups along the stirring element 1.

The stirring element 1 may be a metal cylinder 1c, in particular made of stainless steel, or of austenitic stainless steel. The flutes 1d are also made of stainless steel, or austenitic stainless steel. The stirring element 1 and the flutes 1d are preferably made of a non-magnetizable material.

Figure 5D:
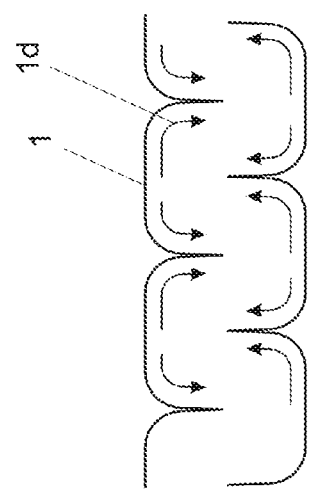
FIG. 5d: shows an example of flutes molded in the stirring element.

Alternatively, the stirring element 1 may be a cylinder that is transparent to light, in particular to ultraviolet light. Such a transparent cylinder may be made for example of quartz, allowing the transmission of wavelengths of between 100 nm and 400 nm, in particular between 100 nm and 300 nm. The flutes 1d can then be metallic, made of a non-magnetizable metal or of a non-metallic material such as glass or quartz. Alternatively, the flutes 1d may be formed directly in the wall of the quartz stirring element 1, as shown for example in FIG. 5d. In the case in which the stirring element is transparent, its outer surface can be covered with a film that reflects suitable wavelengths, in particular the UV used for treating the liquids. Such a reflective film may be perforated at the locations at which the light is emitted, so as to allow it to reach the liquids passing through the stirring element 1. The perforations may be simple windows or a linear opening extending along a substantial length of the stirring element 1, corresponding for example to the length of a UV LED strip disposed along the stirring element 1. The reflective film thus disposed makes it possible to concentrate the UV radiation toward the fluid passing through the stirring element 1 and to improve the effectiveness thereof. Alternatively, the reflective film can be disposed on an internal wall of the irradiation module, so as to concentrate the light irradiation toward the liquid. Such a film may be made up of or comprise polymers that reflect the wavelengths used, such as Teflon or PTFE. Other, equivalent polymers can be chosen, either in combination with or as a replacement for PTFE.

In order to further increase the effectiveness of the irradiation, the flutes 1d can be covered with a reflective film, which is either identical to Teflon or of a different kind, thereby making it possible to irradiate the layers of liquid that are deepest in the circulating stream of treated liquid. The flutes 1d may alternatively be made entirely of a reflective polymer.

According to a preferred provision, the flutes 1d are disposed on a central portion, of length 1, of the stirring element 1, for example on two thirds, or three quarters, of its total length L. According to such a provision, the end portions of the stirring element 1 are free of any flutes 1d.

The device according to the present invention has at least one magnetic device 2, preferably two magnetic devices 2. The magnetic devices 2 each have at least one permanent magnet 2a, having a north pole n and a south pole s. A permanent magnet 2a may be circular and surround the stirring element 1. It may alternatively be in the form of two hemispheres or a plurality of arc segments disposed around the stirring element 1, or be in the form of a parallelepiped disposed along the stirring element 1. A magnetic device 2 may group together a plurality of permanent magnets 2a regardless of their shape. When the permanent magnets 2a have a parallelepipedal shape, their south pole s and north pole n may be disposed at each of their ends. Alternatively, the south pole s and north pole n may be distributed on two opposite lengths of the parallelepiped. Independently of the distribution of their south and north poles, the parallelepipedal permanent magnets 2a may be arranged parallel to the stirring element 1, meaning such that their length is oriented along the longitudinal axis of the stirring element 1, or perpendicularly to the stirring element 1. Several parallelepipedal magnets can thus be distributed around the stirring element 1 and constitute a magnetic device 2.

Figure 3A:
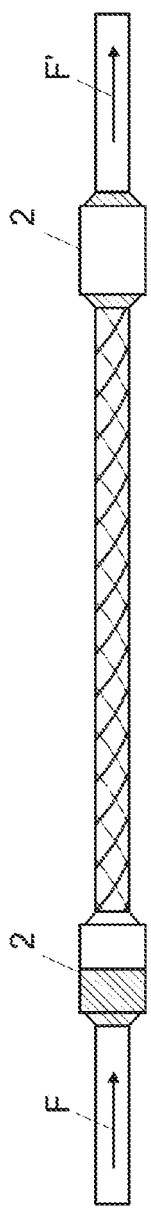
FIGS. 3a, 3b, 3c: show schematic views of one embodiment according to the present invention.
Figure 3C:
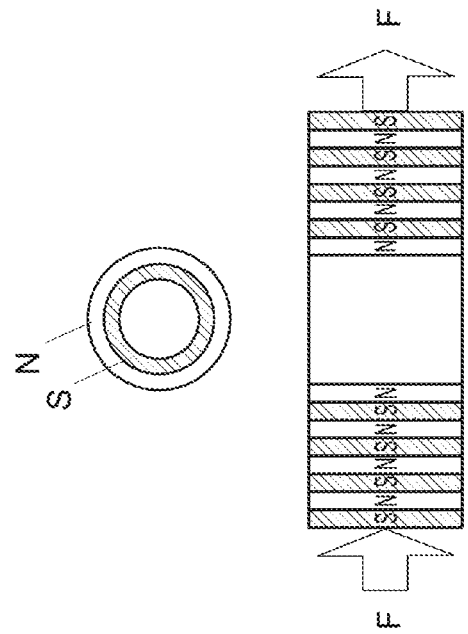

Alternatively, the permanent magnets 2a may be circular, either in the form of a disk, or in the form of rings. When they are in the form of a ring, their south-north polarization may be radial. Such polarization results from the south pole a and north pole n of the permanent magnet 2a being distributed on the internal and external faces of the ring. According to such a configuration, the magnetic field produced by the permanent magnet 2a will be directed perpendicularly to the direction of flow of the fluid F to be treated in the stirring element 1. A plurality of circular permanent magnets having radial polarization may be grouped together within a magnetic device 2. FIG. 3c schematically depicts an exemplary embodiment of the magnetic device 2 comprising permanent magnets 2a having axial polarization. The permanent magnets 2a may, according to this configuration, be separated by an interposed metal element EI. The interposed metal element EI may be inserted between two contiguous permanent magnets 2a, or between groups of permanent magnets 2a. Within a group of permanent magnets 2a having radial polarization, the contiguous magnets may have reversed polarity. The groups of permanent magnets 2a may comprise two magnets or more, such as four, six, eight or ten permanent magnets having radial polarization. According to one particular embodiment, the magnetic device 2 may comprise two groups of eight permanent magnets 2a having radial polarization, which are separated by an intermediate metal element EI.

Figure 3B:
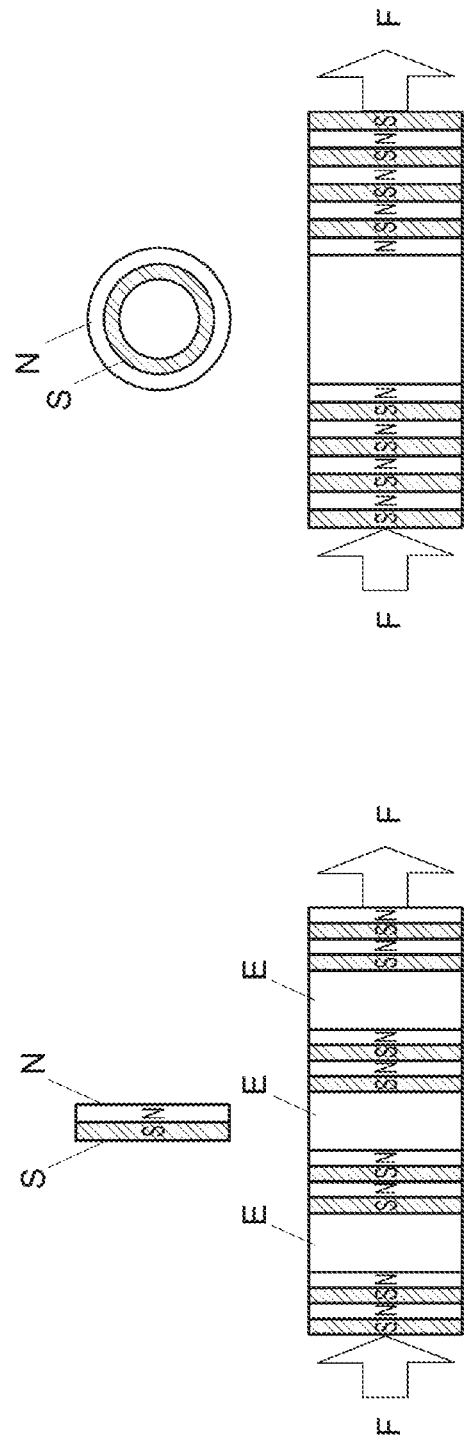

Axial polarization of the circular magnet 2a is achieved when the south and north poles are distributed on the opposite lateral surfaces of the ring. According to this arrangement, the magnetic field produced by the permanent magnets 2a will be oriented substantially parallel to the direction of flow of the fluid F in the stirring element 1. A plurality of circular permanent magnets 2a having axial polarity may be grouped together within a magnetic device 2. The permanent magnets may, within one and the same magnetic device 2, be in direct contact, or be separated by a spacer E. The spacer E may have a variable thickness. It may, for example, correspond to the thickness of one permanent magnet 2a or of two permanent magnets 2a, or of more than two permanent magnets. The spacer E may be interposed between two permanent magnets 2a or between two groups of permanent magnets 2a. The spacer E is preferably made of a non-metal material. The spacer E may be made, for example, of polymer material. Each of the groups of permanent magnets 2a may contain two or more than two permanent magnets 2a, for example three or four or more permanent magnets 2a. An example of a magnetic device is illustrated in FIG. 3b. A magnetic device 2 according to this provision has four pairs of permanent magnets having axial polarization and three spacers E, each spacer E being disposed between two pairs of permanent magnets 2a. The permanent magnets 2a are paired up such that the south pole of one of the two permanent magnets 2a faces the north pole of the permanent magnet with which it is paired up.

A magnetic device 2 according to the present invention may group together circular magnets 2a having axial and radial polarizations. When one and the same magnetic device 2 groups together a plurality of permanent magnets 2a having axial polarization, the south-north orientation of the permanent magnets 2a may be identical or inverted. When one and the same magnetic device 2 groups together a plurality of permanent magnets 2a having radial polarization, the south-north orientation of the permanent magnets 2a may be identical or inverted.

The permanent magnets 2a, within one and the same magnetic device 2, may be side by side or be separated by an interposed metal element EI. Such an interposed metal element may in particular be of the ferritic type, such as ferritic stainless steel, and influence the magnetic field produced by the permanent magnets 2a with which it is associated. In particular, in the case of circular permanent magnets 2a having radial polarity, the interposed metal element EI may orient the magnetic field in some other way than perpendicularly to the direction of flow of the fluid F in the stirring element 1. In this case, the magnetic field resulting from such an assembly may be oblique or even parallel to the direction of flow of the fluid F in the stirring element 1.

According to a preferred provision, a magnetic device 2 according to the present invention has an assembly of several circular permanent magnets 2a having radial polarization, combined with at least one intermediate metal element EI. In particular, such a magnetic device 2 has two pairs of circular permanent magnets 2a having radial polarity that are separated by an interposed metal element EI. Preferably, within a pair of magnets 2a, the south-north polarities are reversed. In other words, the south pole of one of the permanent magnets 2a is disposed on the internal face of the ring while the south pole of the contiguous permanent magnet 2a is disposed on the external face of the ring. The pairs of permanent magnets 2a are preferably disposed symmetrically on either side of the interposed metal element EI. According to such a symmetric arrangement, the circular permanent magnets situated at the two ends of the magnetic device 2 are both polarized identically, their south pole being disposed on the internal face of the ring or, by contrast, on the external face thereof.

According to one particular provision, the two magnetic devices 2 may be identical to one another, meaning that the disposition of the permanent magnets 2a is the same in each of the two magnetic devices 2. According to another provision, which is preferred in the scope of the present invention, the two magnetic devices 2 are inverted in that the disposition of the permanent magnets 2a is reversed from one magnetic device 2 to the other.

According to a preferred configuration, the treatment device D comprises two magnetic devices 2 that are each disposed at one end of the stirring element 1. They are advantageously disposed around a portion of the stirring element 1 that does not have flutes 1d. In this way, the fluid F to be treated, when it passes through the stirring element 1, passes through a magnetic field before passing through the section of the stirring element 1 that is provided with flutes 1d. It then passes through a second magnetic field after passing through the section of the stirring element 1 that is provided with flutes 1d, just before being collected at the outlet S of the stirring element 1.

The distance l corresponding to the section of the stirring element 1 that is provided with flutes 1d may vary depending on the power of the magnetic fields generated. For example, the length l may be determined such that the magnetic fields generated by the magnetic devices 2 do not interact. Alternatively, the length l may be short enough for the magnetic fields generated by the magnetic devices 2 to interact. More generally, the degree of interaction between the magnetic fields depends on the length l. The interaction of the magnetic fields may in this case be attraction or repulsion depending on the disposition of the permanent magnets 2a within the magnetic devices 2.

According to one preferred provision of the invention, the length l is determined so as to allow the interaction of the magnetic fields generated by the magnetic devices 2. Advantageously, the magnetic interaction is of the repulsion type.

The permanent magnets 2a may be of different types depending on the expected properties. For example, magnets that are resistant to high temperatures may be recommended in order to allow the device to be washed at a high temperature such as 80 degrees Celsius or 100 degrees Celsius or to be steam washed at temperatures above 100 degrees Celsius. Magnets of the ferric type, which may comprise elements other than iron, such as copper, aluminum or nickel, may advantageously be used. Alternatively, magnets based on samarium or cadmium may be employed. Depending on the particular needs of the present invention, permanent magnets 2a based on neodymium may be chosen. Magnets comprising cobalt, boron, or other elements are alternatively envisioned.

The magnetic devices 2 may include permanent magnets 2a of different types or of the same type.

Optionally, one or more additional magnetic devices 2 may be disposed around a portion of the stirring element 1 that is provided with flutes 1d. In this way, the fluid F to be treated is also subjected to the concomitant effect of the flutes 1*d* and of a magnetic field. The additional magnetic device(s) 2*a* may be identical to or different than the terminal magnetic devices. They may in particular be made up of permanent magnets 2*a* of parallelepipedal shape.

According to a preferred configuration, the treatment device D comprises two magnetic devices 2 that are each disposed at one end of the stirring element 1, around a portion of the stirring element 1 that does not have flutes 1*d*. The first magnetic device 2, which is disposed before the portion of the stirring element 1 that is provided with flutes 1*d*, comprises an assembly of permanent magnets 2*a* having axial polarization, and the second magnetic device 2, which is disposed after the portion of the stirring element 1 that is provided with flutes 1*d*, comprises an assembly of permanent magnets 2*a* having radial polarization. Preferably, the arrangement is the one described by FIGS. 3*a*, 3*b* and 3*c*. The first magnetic device 2 comprises four groups of permanent magnets 2*a* having axial polarization, the groups of permanent magnets 2*a* being separated by spacers E. The second magnetic device 2 comprises two groups of permanent magnets 2*a* having radial polarization, which are separated by an interposed metal element EI.

According to one particular arrangement, the stirring element 1 may comprise more than one section provided with flutes 1*d*, which may or may not be separated by a magnetic device 2*a*.

The magnetic devices 2 may be surrounded by magnetic shielding, such as a layer of ferritic steel 2*b*. According to one particular provision, the layer of magnetic shielding extends along the entire length of the stirring element 1. According to an alternative provision, only the magnetic devices 2 are covered by a layer of magnetic shielding 2*b*.

The magnetic devices 2 and their magnetic shielding 2*b* are advantageously covered with a protective layer of polymer, such as a plastics material 2*c*.

According to one aspect of the present invention, the assembly made up of the stirring element 1 and the magnetic devices 2, accompanied by their protective layer 2*c* and layer of magnetic shielding 2*b*, is entirely or partially encapsulated in an enclosure made of austenitic stainless steel 3. Such an enclosure can be in the form, for example, of a tube 3*a* containing the magnetic devices 2 along a length equal to or less than the length of the stirring element 1. The ends of the tube 3*a* forming the enclosure 3 can be closed with the aid of sleeves made of austenitic stainless steel 3*b*.

The enclosure can then be insulated in a gel-foam suitable for the magnetic devices.

According to one advantageous provision, the stirring element 1 may be surrounded, along its entire length or only along a portion thereof, by a heating system or a cooling system (not shown). One or more feed pipes may be provided to allow other fluids to be fed into the stirring element 1, either sequentially or concomitantly in order to effect mixtures. The other fluids admitted may be liquids or gases. One or more purge pipes may also be provided along the stirring element 1, in particular to allow total or partial degassing of the treated fluids.

Advantageously, the feed pressure of the fluids to be treated can be regulated upstream of the feed. Stirring can thus take place at atmospheric pressure or at a pressure greater than atmospheric pressure, such as 2, 3, 10 or 50 bar. Alternatively, a vacuum pump can be included so as to create a negative pressure in the stirring element 1.

The treatment device D according to the present invention may also have a UV irradiation module 3, illustrated in FIG. 6, for eliminating or reducing the microorganisms present in the liquid to be treated. Such microorganisms may be pathogens and may represent a risk of poisoning for the consumer. Moreover, certain microorganisms may modify the liquid, in particular during extended storage. Sulfites or other preservatives are often used as germicides, but these have potentially harmful effects for the consumer. The UV irradiation module 3 makes it possible to limit or entirely eliminate the use of germicidal additives in the liquid to be treated, in particular sulfites. The liquid can thus be treated according to organic or natural standards. The UV irradiation module 3 comprises in particular at least one UV irradiation source 3*a*, 3*b*, 3*c*, 3*d* oriented toward the liquid to be treated. The TV irradiation module 3 thus makes it possible to treat the liquid in a continuous manner as it flows through the stirring element 1. The wall of the stirring element 1 is in this case transparent to TV so as to be able to irradiate the liquid while it passes through the stirring element 1. It may in this case be made of quartz, with a thickness of between about 2 mm and 50 mm depending on the diameter d of the stirring element 1, the pressure of the liquid passing through the latter, and any other parameters. The UV irradiation source(s) 3*a*, 3*b*, 3*c*, 3*d* may take the form of LEDs or groups of LEDs disposed along the stirring element 1 and outside the latter. The UV emitted by such TN irradiation sources is preferably TN of type C, the wavelengths of which are between 100 nm and 280 nm. Other wavelengths or a mixture of several wavelengths may nevertheless be emitted. The TV irradiation sources 3*a*, 3*b*, 3*c*, 3*d* may be disposed continuously along the stirring element 1, preferably next to the fluted portions. This is because the flutes 1*d*, by allowing the flows of liquid to be divided and stirred, increase their exposure to light irradiation and consequently the effectiveness of the germicidal effect of such irradiation. In addition, opaque liquids such as red wine, or even milk, can easily be treated in bulk by virtue of the flutes 1*d* of the stirring element 1. The division of the flows of liquids thus makes it possible to limit the size of the treatment device and the duration of exposure of the liquid to UV. The combined effect of the flutes 1*d* and the UV irradiation exhibits an advantageous synergy in the treatment of the liquids. The UV irradiation module 3 and/or the stirring element 1 may be equipped with a reflective film as described above.

Figure 7:
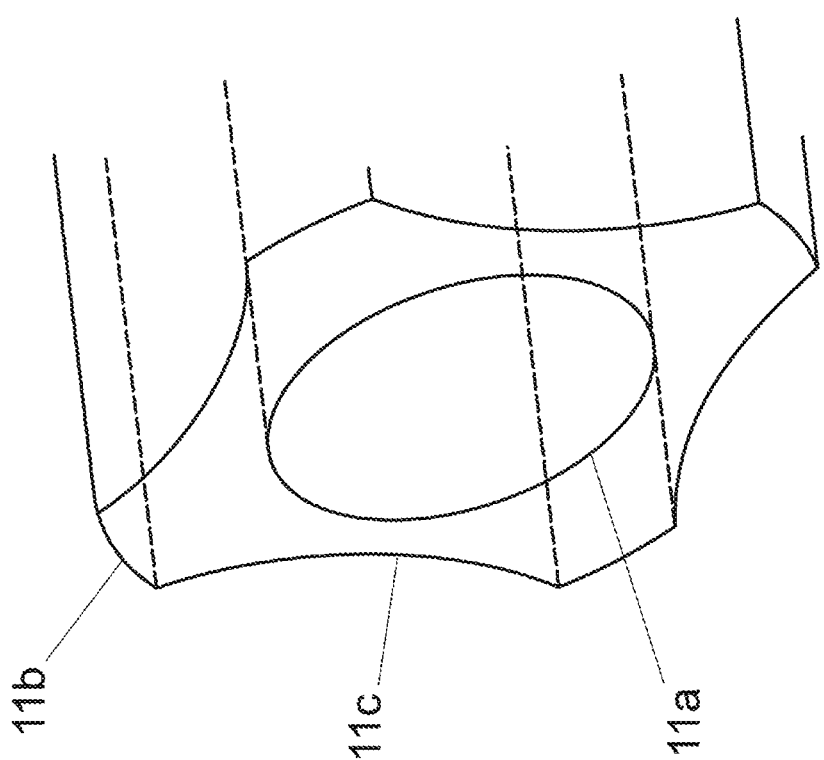
FIG. 7: shows an example of a stirring tube geometry.
Figure 8:
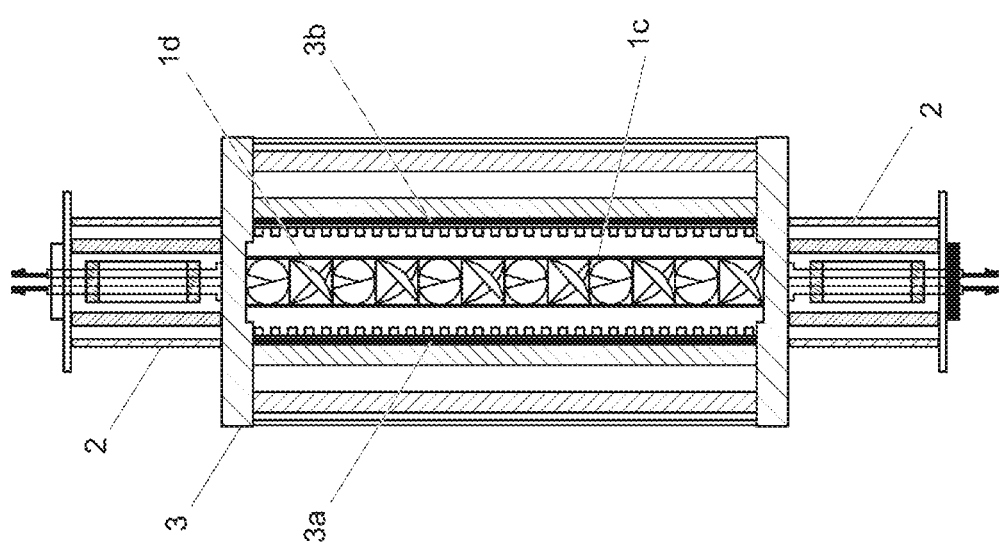
FIG. 8: shows a schematic view of a treatment device comprising both a UV irradiation module and magnetic devices.

The stirring element 1 has an internal surface 11*a* and an external surface 11*b*, which may both be entirely cylindrical and concentric. Alternatively, one or the other of the internal surface 11*a* and external surface 11*b*, or both, may have one or more recesses 11*c* (FIG. 7). Such recesses may be longitudinal and extend along the entire length of the stirring element 1 or along only a part of its length. Alternatively or in addition, recesses 11*c* of circular or elliptical shape may be provided right across the surfaces of the stirring element 1. Such recesses 11*c* have the particular feature of forming concave curvatures in the walls of the stirring element 1, having the effect of concentrating the UV radiation toward the interior of the stirring element 1, or at the very least of limiting their reflection toward the outside.

The UV irradiation module 3 may be used for the photolysis of undesirable compounds in the beverage. Thujone may for example be broken down in order to keep the proportions thereof beneath regulatory thresholds or in order to break it down completely.

The UV irradiation module 3 may advantageously be disposed between two magnetic devices 2. When more than two magnetic devices 2 are disposed along the stirring element 1, several UV irradiation modules 3 may be inserted. In order to limit the space requirement of the treatment device D, the UV irradiation module(s) 3 may be integrated in the magnetic shielding or included in its enclosure.

Thus, it is possible to synergize the stirring by the flutes of the liquid to be treated both with the magnetic field and the UV irradiation. In this way, the effects of the UV irradiation are maximized and the space requirement of the treatment device remains compact. It is noteworthy that several steps of the treatment are carried out concomitantly. In particular, the steps of treating the organoleptic properties and germicidal properties are carried out concomitantly.

The treatment device D may also comprise an on-line analysis module 4 for monitoring several parameters in real time. One or more of the physicochemical parameters chosen from the pH, the redox potential, the conductivity, the amount of dissolved oxygen and/or $CO_2$ and the turbidity can be monitored, continuously or in a batchwise manner. An analysis of the microorganisms present in the treated liquid is likewise possible, either in addition to or as a replacement for the physicochemical analysis, as required. Preferably, the analysis is carried out continuously. A bypass pipe 40 may be connected to the stirring element 1 or at the outlet of the stirring element 1 in order to conduct a portion of the treated liquid through an analysis device 5. The bypass pipe 40 may be provided with a filter 42 and optionally a bypass loop 40b for passing the liquid to be analyzed either through, or outside the filter 42. One or more valves 41a, 41b may be included in the analysis module 4 in order to close or open the pipes. The liquid to be analyzed is conveyed toward the analysis device 5 in order to determine one or more physicochemical or biological properties thereof.

The analysis device 5 may be a flow cytometry (FCM) apparatus or any other analysis device that is useful for determining parameters on-line, and also a combination of measurement devices.

The treatment device D may thus be used for the purposes of research, development or optimization of the method. It may also allow frequent quality controls as part of production.

The treatment device D may be easily adapted to systems that are already installed. It may, for example, be adapted to a tangential filter or to other existing equipment. It also affords the possibility of modular modification of the pre-existing systems. In this case, the treatment device D may be in the form of a basic arrangement comprising the stirring element 1 and at least one magnetic device 2. It may also comprise one or the other of the UV irradiation module 3 and analysis module 4, or a combination of both.

The present invention also covers a method for treating a fluid F, comprising the steps of:
  a) feeding a stirring element 1 with fluid F to be treated,
  b) causing the fluid F to be treated to pass through a first magnetic field,
  c) causing the fluid F to pass through several sets of flutes 1d such that it is stirred physically,
  d) causing the fluid F to be treated to pass through a second magnetic field,
  e) collecting the treated fluid F'.

Step a) may be effected with the aid of a pump P. The feed of the fluid may be effected at ambient pressure or at a different pressure. The temperature of the fluid to be treated may additionally or alternatively be conditioned upstream of the feed. The magnetic field that is passed through in step b) is generated by a magnetic device 2 according to the invention as described above. Steps b) and c) are preferably successive. However, they may also be concomitant. The expressions "pass through a magnetic field" or "cause the fluid to pass through a magnetic field" denote essentially the passage of the fluid through a magnetic device 2, as described above.

Steps b) and c) may optionally be repeated several times, either by using an open-loop device, or by means of a plurality of sections provided with flutes that are separated by a plurality of magnetic devices 2.

The treatment method according to the present invention can be carried out in an entire tank or only in a part of this tank. The storage tank may, to this end, be provided with two outlets, only one of which is connected to the treatment device D of the present invention.

The fluid F to be treated is advantageously a wine or some other fermented alcohol, such as beer, or a distilled alcohol.

The method according to the present invention may also comprise the step c') of irradiating the fluid F with ultraviolet light as it passes through the sets of flutes 1d. Step c') may in particular be carried out by means of one or more UV irradiation sources disposed outside the stirring element between two magnetic devices 2.

REFERENCE NUMERALS EMPLOYED IN THE FIGURES

1 Stirring element
1a Diaphragm
1b Connecting flange
1c Tube of the stirring element 1
1d Flutes
11a, 11b Internal and external surfaces of the stirring element
11c Recesses
2 Magnetic device
2a Permanent magnet
2b Magnetic shielding
2c Protective layer of polymer
3 UV irradiation module
3a, 3b, 3c, UV emission sources
3d
4 Analysis module
Bypass pipe
41a, 41b Valves
42 Filter
Analysis device
A Feed
D Treatment device
d Diameter of the stirring element
EI Interposed metal element
E Spacer
F Fluid to be treated
F' Treated fluid
l Provided length of flutes
L Length of the stirring element 1
P Pump
R Reservoir
S Fluid outlet
s South pole
n North pole

The invention claimed is:

1. A fluid treatment device adapted to treat a flow of a fluid comprising a stirring element of a stirring element's length (L) and at least one magnetic device, wherein the stirring element has a plurality of flutes within its central portion along a central length (1), wherein the plurality of flutes are disposed offset from one another along the stirring element, so as to divide the flow of the fluid as it passes from one flute to the next in a disruptive manner so as to cause disruption of a vortex type in the flow of the fluid, and wherein the at least one magnetic device is disposed around the stirring element at locations that do not have the plurality of flutes.

2. The fluid treatment device as claimed in claim 1, wherein a South-North field lines generated by the at least one magnetic device are oriented parallel to a longitudinal axis of the stirring element.

3. The fluid treatment device as claimed in claim 1, wherein the at least one magnetic device has a plurality of permanent magnets of annular shape and radial polarity, and at least one interposed metal element.

4. The fluid treatment device as claimed in claim 1, comprising at least two magnetic devices disposed on either side of a section of the stirring element that is provided with the plurality of flutes and has the central length (1), such that a magnetic field generated by the at least two magnetic devices interact with one another.

5. The fluid treatment device as claimed in claim 1, wherein the plurality of flutes of the stirring element are paired up such that orientation of the plurality of flutes of one and a same pair is opposite to one another.

6. The fluid treatment device as claimed in claim 1, wherein several sets of flutes are disposed along said stirring element.

7. The fluid treatment device as claimed in claim 1, wherein the plurality of flutes are of helical shape.

8. The fluid treatment device as claimed in claim 1, wherein the stirring element is transparent to ultraviolet (UV), and wherein said fluid treatment device also comprises a UV irradiation module disposed outside the stirring element.

9. The fluid treatment device as claimed in claim 8, wherein the stirring element is partially covered with a film that reflects the UV, and/or wherein walls of the UV irradiation module surrounding the stirring element are covered with said film that reflects the UV.

10. The fluid treatment device as claimed in claim 1, also comprising a module for analyzing at least one parameter on-line by means of an analysis device, and bypass pipes.

11. The fluid treatment device as claimed in claim 1, wherein said fluid treatment device is integrated in a pre-existing installation.

* * * * *